United States Patent
Ruijter

(10) Patent No.: US 8,121,575 B2
(45) Date of Patent: Feb. 21, 2012

(54) MODULATED IF RECEIVER AND METHOD

(75) Inventor: Hendricus De Ruijter, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 705 days.

(21) Appl. No.: 12/243,338

(22) Filed: Oct. 1, 2008

(65) Prior Publication Data

US 2009/0098848 A1  Apr. 16, 2009

Related U.S. Application Data

(60) Provisional application No. 60/978,925, filed on Oct. 10, 2007.

(51) Int. Cl.
  *H04B 1/10* (2006.01)
  *H04K 3/00* (2006.01)
(52) U.S. Cl. ........................ 455/296; 455/317
(58) Field of Classification Search .............. 455/296, 455/306, 310–311, 317, 324; 375/346, 349–350
  See application file for complete search history.

(56) References Cited

U.S. PATENT DOCUMENTS

| | | | | |
|---|---|---|---|---|
| 4,736,390 A | * | 4/1988 | Ward et al. ................. | 375/316 |
| 6,148,184 A | * | 11/2000 | Manku et al. ................ | 455/110 |
| 6,735,422 B1 | | 5/2004 | Baldwin et al. ............ | 455/232.1 |
| 6,868,128 B1 | * | 3/2005 | Lane ............................ | 375/319 |
| 2001/0041542 A1 | * | 11/2001 | Manku et al. ................... | 455/86 |

OTHER PUBLICATIONS

Massachusetts Institute of Technology, "High Speed Communication Circuits and Systems", Project 2, GMSK Transceivers, Spring 2003, 12 pgs.
Yan et al., "A Low-Power FSK Modulator Using Fractional-N Synthesizer for Wireless Sensor Network Application", Institute of Microelectronics, 2006, 4 pgs.
Philips Semiconductors, "SA2400A Single chip transceiver for 2.45 GHz ISM band," 2004, 34 pages.

* cited by examiner

*Primary Examiner* — Lee Nguyen
(74) *Attorney, Agent, or Firm* — O'Keefe, Egan, Peterman & Enders LLP

(57) ABSTRACT

A modulated intermediate frequency receiver is shown having a low noise amplifier for receiving a radio frequency signal and a modulation source for generating a modulation signal. A local oscillator generates a modulated local oscillator signal in response to the modulation signal. A first mixer mixes the output of the low noise amplifier with the output of the local oscillator. The output of the mixer is DC filtered and receive bandwidth filtered before input to a demodulator that generates a demodulated received signal. Further embodiments are shown for a complex receiver and having phase or frequency modulation compensation.

30 Claims, 6 Drawing Sheets

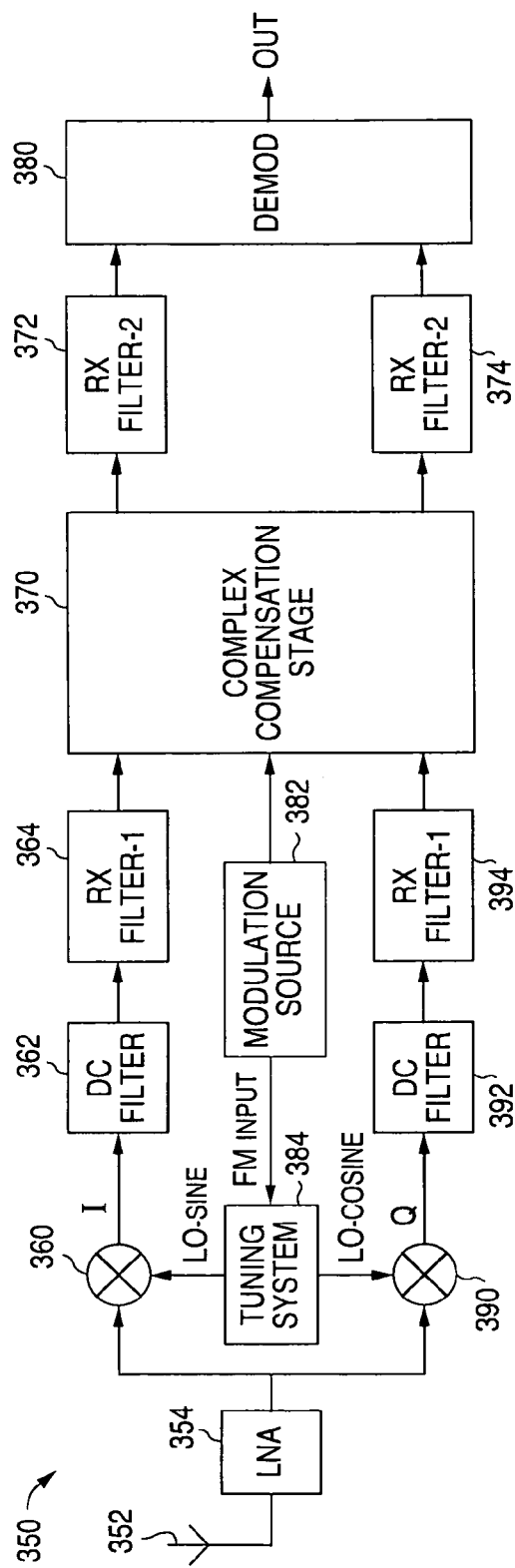
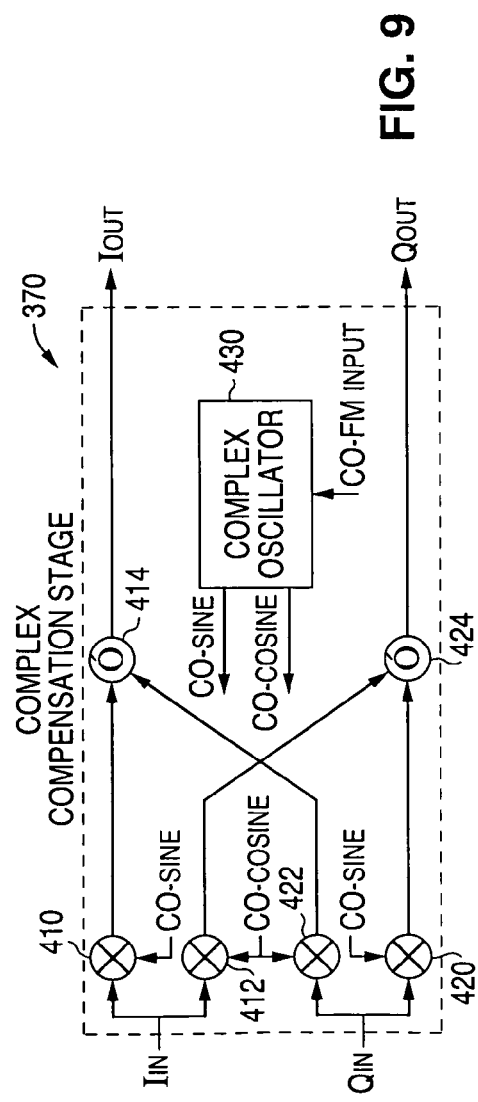
FIG. 8
FIG. 9

MODULATED IF RECEIVER AND METHOD

CROSS-REFERENCE TO RELATED PATENT APPLICATIONS

This patent application claims the benefit of U.S. Provisional Patent Application No. 60/978,925, filed Oct. 10, 2007.

FIELD OF THE INVENTION

This invention pertains to radio receivers and, more particularly, intermediate frequency (IF) receiver circuits.

BACKGROUND OF THE INVENTION

Single chip receivers can be made low cost and small size when the receiver's selectivity filter and demodulator are completely integrated on the same integrated circuit die or chip. To obtain reasonable power consumption, required for long battery live, the intermediate frequency (IF) is chosen to be relatively low, e.g. 200 kHz, or, preferably, Zero-IF.

The Direct-Conversion or so called Zero-IF receiver architecture has gained attention due to the absence of unwanted image reception, which can be problematic in Low-IF architectures. In turn, there are other problems in the Zero-IF architecture that must be solved, such as self mixing in the front-end circuitry, which causes unwanted direct current (DC) signal levels at the output of the mixers. Typically, complex servo loops, often implemented using high resolution Digital to Analog Converters (DACs), are used to remove the DC signal component. See U.S. Pat. No. 6,735,422 for an example of a servo loop solution. Once the servo loops have settled, the DC compensation is frozen such that low frequency signal components are not filtered out during the reception of the information.

FIG. 1 is a circuit diagram illustrating an example of a conventional Zero-IF receiver circuit 10. Note that, in the circuit of FIG. 1, the DC offset correction needs an Offset Voltage Level Detect Analog to Digital Converter 34, a digital Offset Voltage Detector 36, Control and Timing Logic 40, a DC Estimate combiner 56, a Gain compensation Amplifier 70, a Digital Filter 72, 74, and a DC Digital to Analog Converter (DAC) 76. When a complex demodulator is implemented, then this DC offset correction circuitry is required for both the I and Q channels. This typically adds significantly to the chip area required to implement the circuit and increases the cost of the receiver chip.

Conventional Zero-IF receiver architectures, such as the receiver illustrated in FIG. 1, use one or more DC filters to cancel the previously mentioned DC signal levels present in the IF chain. The DC cancellation will result in a notch at the center of the receive channel response as indicated in the frequency response curve shown in FIG. 2.

Some modulation types can withstand low frequency filtering in the middle of the channel. Direct-Conversion Receivers are well suited for those modulation types because the DC signal levels at the output of the mixer can be effectively canceled by a simple high pass filter. An example of a Direct-Conversion Receiver 100, such as may be found in the SA2400 part from Philips/NXP, is shown in FIG. 3. In this example, a Zero-IF receiver 100 has two DC filters 116, 118, 124, 126 per branch, which are illustrated in the circuit diagram as a block with a capacitor inside. The modulation type is Direct Sequence Spread Spectrum (DSSS) in accordance with IEEE standard 802.11b. This modulation technique can withstand some filtering around the center of the channel and the receiver architecture of FIG. 3 is well suited to this application.

However, other modulation types, such as On/Off Keying (OOK), Frequency Shift Keying (FSK), Gaussian Frequency Shift Keying (GFSK), Minimum Shift Keying (MSK), Phased Shift Keying (PSK), and Quadrature Phased Shift Keying (QPSK), are typically less robust against DC filtering and generally require other receiver techniques, such as the Zero IF approach illustrated in U.S. Pat. No. 6,735,422.

BRIEF SUMMARY OF THE INVENTION

In one embodiment, a receiver circuit has a low noise amplifier (LNA) with an input for receiving a radio frequency signal via an antenna. An output of the LNA is input to a mixer along with a modulated local oscillator signal (LO) produced by a tuning system from a modulation control input signal obtained from a modulation source. The output of the mixer is input to a DC filter in series with a receiver (RX) filter. The output of the RX filter is input to a demodulator to obtain a demodulated received signal.

An embodiment of a modulated intermediate frequency receiver, in accordance with one aspect of the present invention, includes a low noise amplifier having an input for receiving a radio frequency signal and an output and a modulation source configured to generate a modulation control signal at an output. A local oscillator has an input coupled to the output of the modulation source and is configured to generate a modulated local oscillator signal at a first output in response to the modulation control signal from the modulation source. A first mixer has a first input coupled to the first output of the low noise amplifier, a second input coupled to the output of the local oscillator, and an output. A first DC filter has an input coupled to the output of the first mixer and an output. A first receive filter has an input coupled to the output of the first DC filter and an output. A demodulator has a first input coupled to the output of the first receive filter and is configured to generate a demodulated received signal at an output.

A further refinement of this embodiment includes a compensation stage between the first receive filter and the first demodulator, the compensation stage having a first input coupled to the output of the first receiver filter, a second input, and an output. This further refinement also includes a second receive filter between the first receiver filter and the demodulator, the second receive filter having an input coupled to the output of the compensation stage and an output coupled to the first input of the demodulator. In this further refinement, the modulation source is further configured to generate a second modulation control signal at a second output that is coupled to the second input of the compensation stage, where the second modulation control signal is related to the modulation control signal.

In another refinement of this embodiment, the local oscillator is further configured to generate a sine phase of the modulated local oscillator signal at the first output of the local oscillator and generate a cosine phase of the modulated local oscillator signal at a second output of the local oscillator. The demodulator includes a second input and the demodulator is further configured to generate the demodulated received signal from signals received from the first and second inputs of the demodulator. In this refinement, the receiver further includes a second mixer with a first input coupled to the output of the low noise amplifier, a second input coupled to the second output of the local oscillator, and an output. A second DC filter has an input coupled to the output of the second mixer and an output. And a second receive filter has an input coupled to the output of the second DC filter and an output coupled to the second input of the demodulator.

An embodiment of a modulated intermediate frequency receiver with phase compensation includes a low noise amplifier with an input for receiving a radio frequency signal and an output and a modulation source configured to generate a first modulation control signal at a first output and generate a second modulation control signal at a second output. A local oscillator has an input coupled to the first output of the modulation source and is configured to generate a sine phase local oscillator signal at a first output and a cosine phase local oscillator signal at a second output in response to the first modulation control signal from the modulation source. A first mixer has a first input coupled to the first output of the low noise amplifier, a second input coupled to the first output of the local oscillator, and an output. A first DC filter has an input coupled to the output of the first mixer and an output. A first receive filter has an input coupled to the output of the first DC filter and an output. A second mixer has a first input coupled to the output of the low noise amplifier, a second input coupled to the second output of the local oscillator, and an output. A second DC filter has an input coupled to the output of the second mixer and an output. A second receive filter has an input coupled to the output of the second DC filter and an output coupled to the second input of the demodulator. A phase compensation stage has a first input coupled to the output of the first receiver filter, a second input coupled to the output of the second receiver filter, a third input coupled to the second output of the modulation source, and an output. And a discriminator has a first input coupled to the output of the phase compensation stage and configured to generate a received data signal at an output.

An embodiment of a method for receiving a signal in a modulated intermediate frequency receiver sets forth receiving and amplifying a radio frequency signal to obtain a received radio frequency signal, generating a first modulation control signal, and generating a first modulated local oscillator signal responsive to the first modulation control signal. The method also calls for mixing the received radio frequency signal with the first modulated local oscillator signal to obtain a first modulated intermediate frequency signal. The method further recites DC filtering the first modulated intermediate frequency signal to obtain a first DC filtered modulated intermediate frequency signal. The method further recites receive channel bandwidth filtering the first DC filtered modulated intermediate frequency signal to obtain a first bandwidth filtered receive signal. Finally, the method calls for demodulating the first bandwidth filtered receive signal to obtain a received data signal.

A refinement of this embodiment of a receive method calls for generating a second modulation control signal related to the first modulation control signal, mixing the second frequency modulation control signal with the first bandwidth filtered receive signal to reduce modulation introduced by the first modulation control signal to obtain a first compensated receive signal, and receive channel bandwidth filtering the first compensated receive signal before demodulating to obtain the received data signal.

In another refinement of the method, the step of generating a first modulated local oscillator signal involves generating a sine phase and a cosine phase of the first modulated local oscillator signal responsive to the first modulation control signal. The step of mixing the received radio frequency signal with the first modulated local oscillator signal to obtain a first modulated intermediate frequency signal involves mixing the received radio frequency signal with the sine phase of the first modulated local oscillator signal to obtain the first modulated intermediate frequency signal. This refinement also calls for mixing the received radio frequency signal with the cosine phase of the first modulated local oscillator signal to obtain a second modulated intermediate frequency signal, DC filtering the second modulated intermediate frequency signal to obtain a second DC filtered modulated intermediate frequency signal, and receive channel bandwidth filtering the second DC filtered modulated intermediate frequency signal to obtain a second bandwidth filtered receive signal. In this refinement, the step of demodulating the first bandwidth filtered receive signal to obtain a received data signal involves demodulating the first and second bandwidth filtered receive signals to obtain the received data signal.

A different refinement of the method calls for generating a second modulation control signal related to the first modulation control signal and mixing the second modulation control signal with the first bandwidth filtered receive signal to reduce modulation introduced by the first modulation control signal to obtain a first compensated receive signal. This refinement also calls for receive channel bandwidth filtering the first compensated receive signal before demodulating to obtain the received data signal. This refinement further sets forth mixing the second modulation control signal with the second bandwidth filtered receive signal to reduce modulation introduced by the first modulation control signal to obtain a second compensated receive signal and receive channel bandwidth filtering the second compensated receive signal before demodulating to obtain the received data signal. In this refinement, the step of demodulating the first and second bandwidth filtered receive signals to obtain the received data signal involves demodulating the first and second compensated receive signals to obtain the received data signal.

Still another embodiment of the method calls for generating a second modulation control signal related to the first modulation control signal and integrating the second modulation control signal to obtain a compensation signal. This refinement also involves converting the first and second bandwidth filtered receive signals to a vector to phase converted bandwidth filtered receive signal and summing the vector to phase converted bandwidth filtered receive signal and the compensation signal to obtain a phase compensated receive signal. In this refinement, the step of demodulating the first and second compensated receive signals to obtain the received data signal further comprises phase or frequency discriminating the phase compensated receive signal to obtain the received data signal.

BRIEF DESCRIPTION OF THE DRAWINGS

Certain exemplary embodiments are described herein, where:

FIG. 8 is a functional block diagram illustrating an embodiment of a receiver having a Complex Compensation Stage for substantially removing the LO modulation from the complex IF signal;

FIG. 9 is a functional block diagram illustrating an embodiment of the Complex Compensation Stage of FIG. 7.

DETAILED DESCRIPTION OF THE INVENTION

In order to achieve low cost integration, the present invention obtains a satisfactory solution by filtering out the DC signal components using simple DC filters, but with reduced low frequency signal loss compared to conventional DC filter solutions. In the present approach, two servo loops and two DACs may be excluded from the receiver circuit as compared to conventional receiver solutions. In the receiver embodiments discussed below, a Local Oscillator (LO) modulation technique is employed to reduce the low frequency signal loss caused by DC filtering.

To reduce reciprocal mixing, LO signals are traditionally optimized to have low phase noise or low jitter. In the present receiver embodiments, the LO signal is intentionally modulated, e.g. by frequency or phase modulation, across the receiver bandwidth characteristic. Modulation of the Local Oscillator signal will modulate the IF frequency such that the null in the IF pass-band caused by DC filtering (to remove the DC offset) is smeared out in the frequency domain. The sharp attenuation around the DC signal level is thereby replaced by a small amount of attenuation across the modulation bandwidth.

The modulated LO signal will add some modulation to the received IF signal. The modulation control signal used to control the modulation of the LO signal may be reused, for example, to remove or at least reduce the frequency modulation in a frequency modulation (FM) compensation block or, by way of another example, to remove or reduce phase modulation, such that the demodulation process is not disrupted.

In On-Off Keying (OOK) or Amplitude Shift Keying (ASK) receivers, a modulation compensation block may not be necessary since the information in the signal is encoded in the signal amplitude. This makes the present receiver embodiments particularly useful for application to OOK and ASK receivers.

Figure 1:
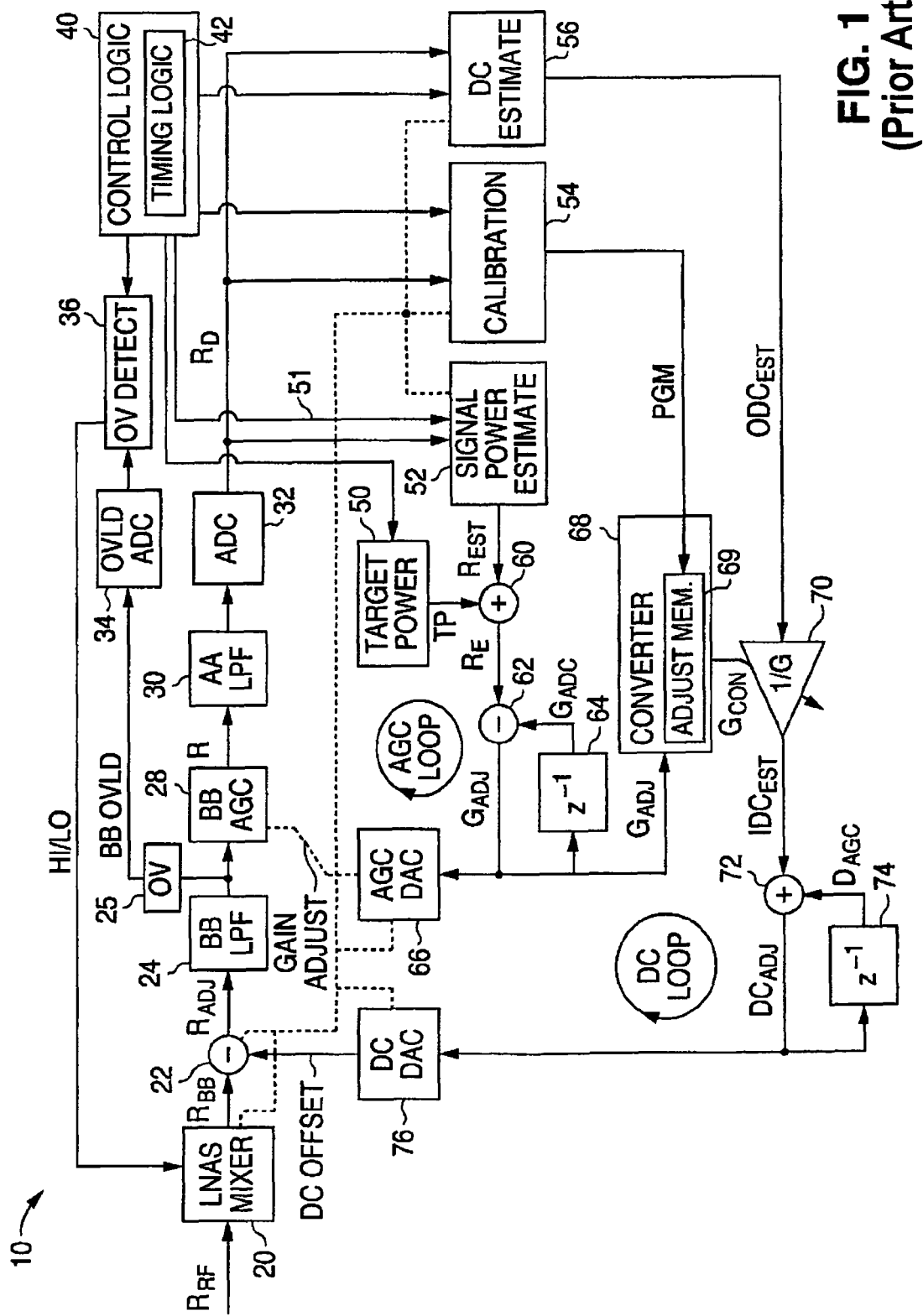
FIG. 1 is a circuit diagram illustrating an example of a Zero-IF receiver.
Figure 2:
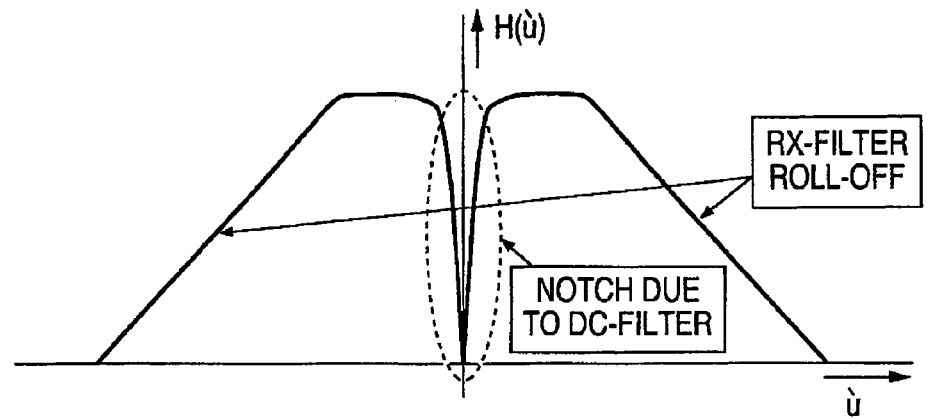
FIG. 2 is a frequency response curve illustrating the response obtained from a DC filter.

The receiver design can be much more compact and lower cost by removing the DC compensation loop and keeping the DC Filter active during reception. One problem is that the DC component and the low frequency signals are filtered by one or more DC filters, i.e. DC filtering. This is illustrated in the frequency response curve of FIG. 2, which shows a notch in the response curve around the center of the channel. For Zero-IF receivers, the DC-Filter will attenuate some energy around the center of the channel shown in the middle of the frequency response. For some modulation techniques, such as OOK, ASK, and Frequency Shift Keying (FSK), this notch filtering will typically disrupt demodulation of the received signal.

In the embodiments of receiver circuits described herein, the receiver features the advantages of Zero-IF without the need for complex DC compensation loops that typically require significant chip area on the integrated circuit die and, consequently, increase cost. In the present invention, the notch caused by DC Filtering is spread out in the frequency domain. This is obtained by modulating the LO signal, as generated in the Tuning System, using a Modulation Source to produce a modulation control signal that controls the modulation of the LO signal. This is illustrated in the receiver 200 shown in the functional block diagram of FIG. 4.

Figure 4:
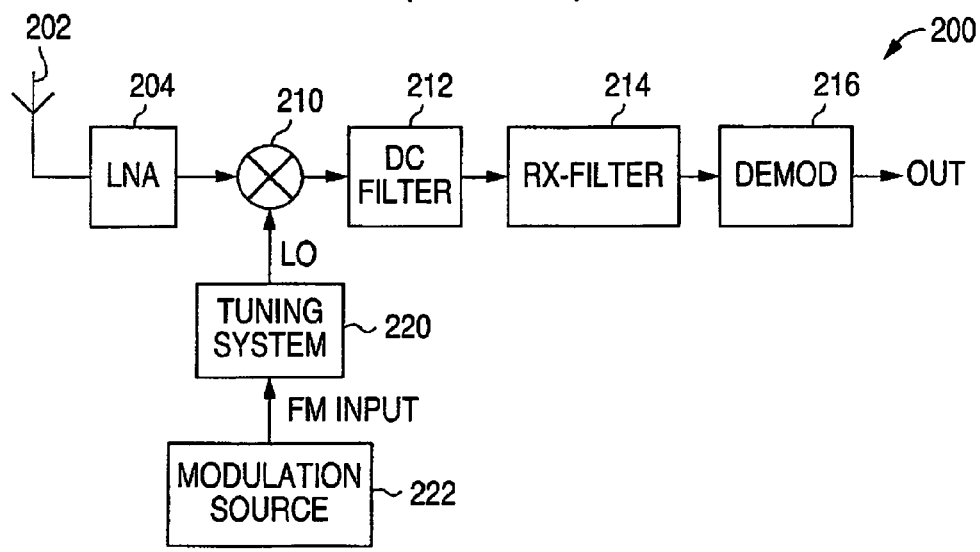
FIG. 4 is a functional block diagram illustrating an embodiment of a receiver circuit having a DC filter and a modulation source.

In the receiver 200 of FIG. 4, an antenna 202 is attached to the input of a low noise amplifier (LNA) 204 to receive a radio frequency signal. The output of the LNA 204 is input to a mixer 210 along with a modulated local oscillator signal (LO) produced by a tuning system 220 in response to a modulation control input signal obtained from a modulation source 222. The modulation source 222 controls the tuning system 220 to modulate the LO signal across the receive bandwidth characteristic. For example, modulation source 222 may be configured to frequency modulate the LO signal output from the tuning system 220 by repeatedly ramping the frequency of the LO signal up to an upper limit of the receive bandwidth frequency and then ramping the frequency down to a lower limit of the receive bandwidth frequency. For phase modulation based solutions, modulation source 222 may be configured to cause tuning system 220 to phase modulate the LO signal by causing positive and negative phase shifts of a nominal phase of the LO signal, e.g. ±90°, which tends to spread the energy of the received signal across the receive bandwidth. The output of the mixer 210 is input to a DC filter 212 in series with a receiver (RX) filter 214. The output of the RX filter 214 is input to a demodulator 216 to obtain a demodulated received data signal OUT. An FSK modulator circuit is one example of a circuit that may be suitable for generating the modulated LO signal of FIG. 4. See Dan Lei Yan, et al., "A Low-Power FSK Modulator using Fractional-N Synthesizer for Wireless Sensor Network Application" for further details of one example of an FSK modulator that may function as a tuning circuit 220.

The modulated LO will modulate the frequency transposition from the RF input signal to the IF signal output by the mixer 210. This approach will spread out the energy of the received signal across the frequency response of the DC filter 212 and RX filter 214. The modulation of the IF frequency causes the null in the IF pass-band caused by DC filtering to be smeared out in the frequency domain. The effective filter shape or response curve is defined by the DC-Filter 212 and the RX Filter 214 along with the modulation parameters of the Modulation Source 222 and the Tuning System 220. The receiver embodiment of FIG. 4 is suitable for use in many typical OOK and ASK applications.

In this embodiment of a receiver 200, the bandwidth of the RX-Filter 214 is substantially smaller than the objected receiver bandwidth and the center frequency of the receive channel is substantially equal to the average LO frequency. An example of a frequency response of the receiver 200 measured at the output of RX-Filter 214 is illustrated in FIG. 5.

Figure 5:
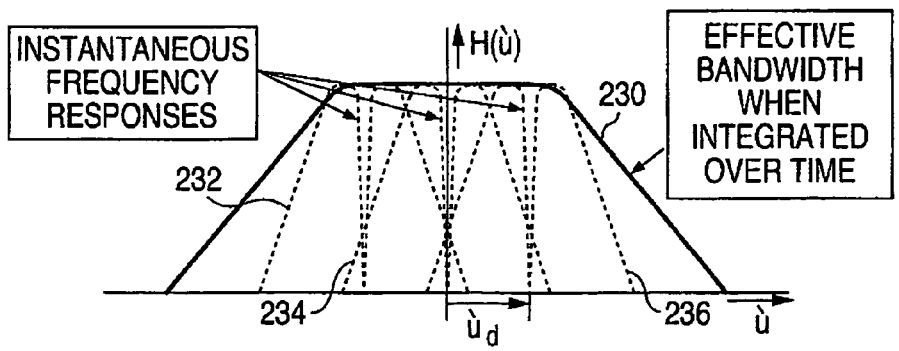
FIG. 5 is a frequency response curve illustrating an example of a response obtained from the circuit of FIG. 4.
Figure 3:
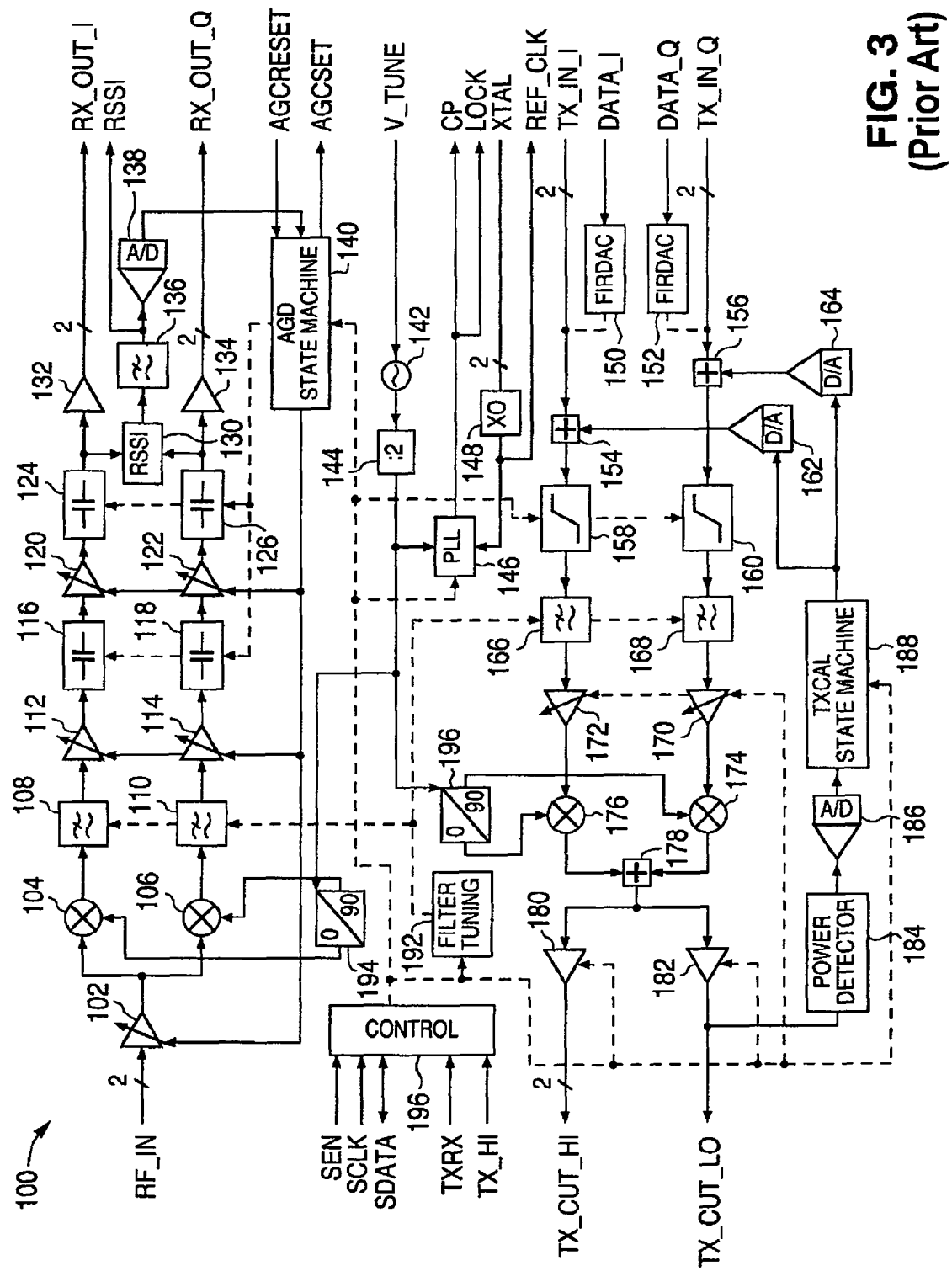
FIG. 3 is a diagram illustrating another example of a Direct-Conversion Receiver.

In FIG. 5, the objected receiver bandwidth is indicated by the thick black line of curve 230 defining the response envelope. Two sets of curves 232 and 236 showing notches spaced at $\acute{u}_d$ from the channel center frequency represents the system operating at the maximum deviation ($\omega_d$) as determined by the Modulation Source 222 in controlling Tuning System 220. Another curve 234 having a notch centered on the channel center frequency represents the system operating at zero deviation. The Modulation Source 222 will provide for continuous modulation such that, when integrated over time, the objected receiver bandwidth is obtained without notch filtering. Note that the sharp attenuation around the DC signal level is replaced by a small amount of attenuation across the modulation bandwidth.

Figure 6:
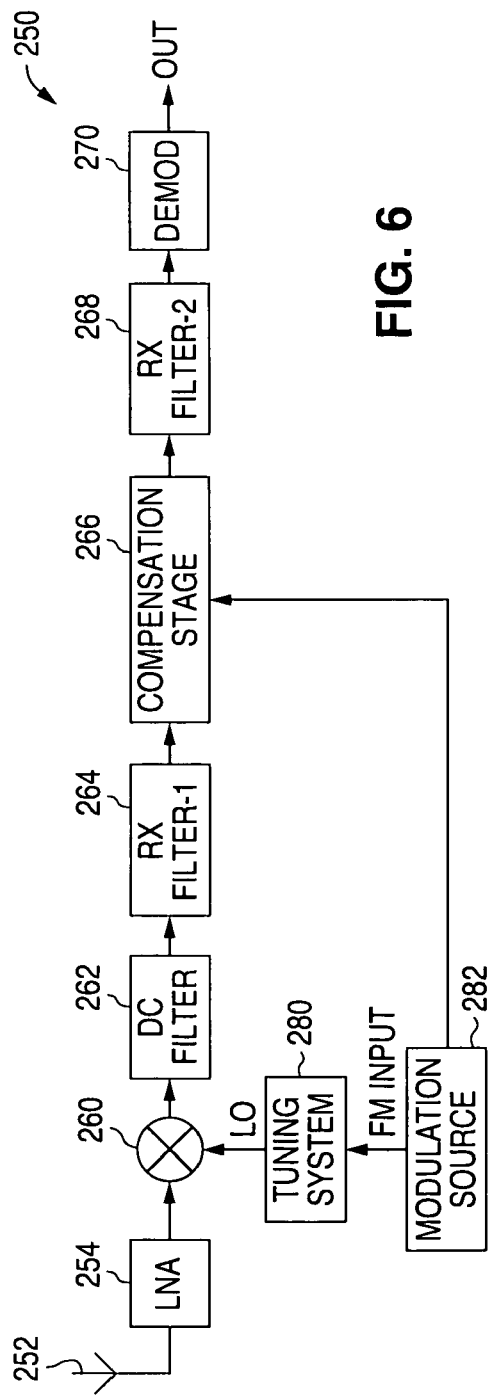
FIG. 6 is a functional block diagram illustrating an embodiment of a receiver having a Compensation Stage for substantially removing the LO modulation from the IF signal.

FIG. 6 is a functional block diagram illustrating another embodiment of a receiver 250 in accordance with another aspect of the present invention. In receiver 250, the rate of modulation introduced by the Modulation Source 282 to the LO signal is substantially higher than the rate of modulation of the received signal. This will allow the receiver 250 to average out the receive bandwidth per received data bit. The frequency modulation of the LO signal will also add frequency modulation on the received signal after the mixing stage. For some modulation types (e.g. PSK, FSK or FM) this LO modulation may disrupt the demodulation process since the demodulator 270 cannot distinguish between the signal modulation (desired signal) and the LO modulation.

In receiver 250, a Compensation Stage 266 is added to the receiver 250 such that the LO modulation is substantially removed from the IF signal. In FIG. 6, a Compensation Stage 266 in series with a second RX filter 268 is inserted between the first RX filter 264 and the demodulator 270. The modulation control signal from the Modulation Source 282 is input to the Compensation Stage 266, which removes the modulation introduced to the received signal by the modulated LO signal. Because of the modulated LO, the bandwidth of RX Filter-1 264 can have a smaller bandwidth than the received signal bandwidth. However, RX Filter-2 268 needs to have sufficient bandwidth to pass the complete received signal bandwidth. As noted above, the frequency modulated LO adds some frequency modulation to the received IF signal. In the embodiment of FIG. 6, the frequency modulation (FM) Compensation Block 266 uses the modulation control signal from modulation source 282 to remove or at least reduce the frequency modulation introduced by the frequency modulated LO signal used in the mixer 260 to obtain the received IF signal such that the demodulation process is not disrupted.

Figure 7:
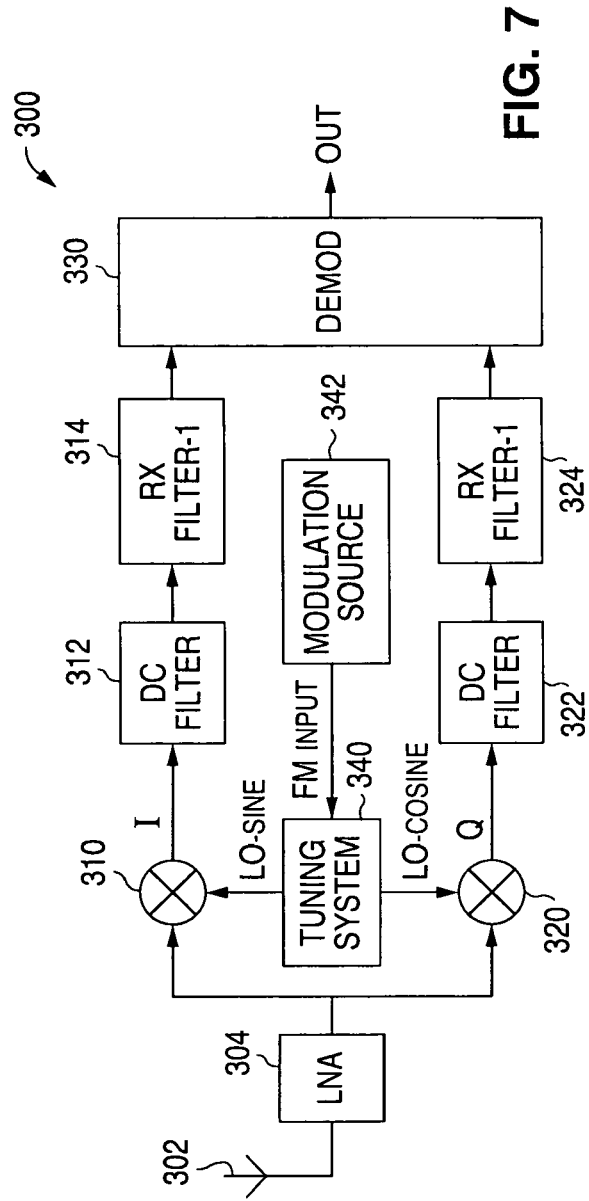
FIG. 7 is a functional block diagram illustrating an embodiment of a receiver having a complex mixer introduced after the LNA that produces a complex IF channel.

An embodiment of a complex receiver 300 in accordance with certain aspects of the present invention is shown in the functional block diagram of FIG. 7. In receiver 300, a complex mixer is introduced after the LNA 304 that produces a complex IF channel to support modulation types that require or benefit from complex demodulation (e.g. phase or frequency modulation encoded signals). In the embodiment of FIG. 7, the FM control signal input provided by the modulation source 342 is split and modulated by the tuning system 340 into a sine phase of the Local Oscillation signal LO-sine and a cosine phase of the LO signal LO-cosine. Note that the FM control signal output from modulation source 342 is changed to control phase modulation in phase modulation embodiments. The LO-sine signal is input to an I channel mixer 310, which mixes the LO-sine signal with the received RF signal to generate an I channel IF signal I that is filtered by an I channel DC filter 312 in series with an I channel RX-filter 314 before input to a complex demodulator 330. The LO-cosine signal is input to a Q channel mixer 320, which mixes LO-cosine with the received RF signal to generate a Q channel IF signal Q that is filtered by an Q channel DC filter 322 in series with a Q channel RX-filter 324 before input to the complex demodulator 330. The resulting embodiment provides demodulated I and Q channels using the DC filtering technique illustrated in FIG. 4, wherein modulation of the IF frequency in each of the I and Q channels causes the null in the IF pass-band caused by DC filtering to be smeared out in the frequency domain.

FIG. 8 illustrates another embodiment of a receiver 350 having a complex IF channel that includes a complex mixer after the LNA 354 and a Complex Compensation Stage 370 in the IF chain that compensates for the LO modulation introduced to the I and Q channels of the received IF signal. In this embodiment, the modulation source 382 provides a modulation control signal input to the Complex Compensation Stage 370. The Complex Compensation Stage 370 has a first input electrically coupled to the output of a first I channel RX filter 364 and a first output electrically coupled to an input of a second I channel RX filter 372. The Complex Compensation Stage 370 also has a second input electrically coupled to the output of a first Q channel RX filter 394 and a second output electrically coupled to an input of a second Q channel RX filter 374. The Complex Compensation Stage 370 will remove or reduce the modulation component on the IF signal, e.g. frequency or phase modulation, that is caused by the LO signal modulation controlled by modulation source 382. This will make the receiver 350 suitable for use with traditional demodulation techniques for phase or frequency modulation types.

The output signals from the second I channel RX filter 372 and second Q channel RX filter 374 are input to a complex demodulator 380 in order to demodulate the I and Q channels to obtain a received data signal. As in the embodiment of FIG. 6, because of the modulated LO introduced to the I and Q channels, the bandwidth of first RX Filter 364, 394 in each of the I and Q channels can have a smaller bandwidth than the received signal bandwidth. However, the second RX Filter 372, 374 in each of the I and Q channels needs to have sufficient bandwidth to pass the complete received signal bandwidth.

FIG. 9 is a functional block diagram illustrating one exemplary embodiment of the Complex Compensation Stage 370 of FIG. 8. In this example, the Complex Compensation Stage 370 includes a complex mixer realized with four multipliers 410, 412, 420, 422 and two summers 414, 424. Also included is a Complex Oscillator 430 whose frequency is controlled from the modulation control input received from the Modulation Source 382 in order to produce a complex oscillator sine phase signal CO-sine and a complex oscillator cosine phase signal CO-cosine.

The I channel input to the Complex Compensation Stage 370 is input to a first mixer 410, where the I channel IF signal is mixed with CO-sine signal and the output of the mixer input to a positive input of a first summer 414. The I channel IF signal is also mixed in a second mixer 412 with the CO-cosine signal and the output of the second mixer is input to a first positive input of a second summer 424. The Q channel IF signal at the Q input to the Complex Compensation Stage 370 is mixed in a third mixer 422 with the CO-cosine signal and the output of the second mixer is input to a positive input of the first summer 414. The Q channel IF signal is also mixed with the CO-sine signal in a fourth mixer 420 and the output of the fourth mixer input to a second positive input of the second summer 424. The output of the first summer 414 is the I channel output of the Complex Compensation Stage 370 while the output of the second summer 424 is the Q channel output of the Complex Compensation Stage 370.

The modulation at the output of the Complex Oscillator 430 of FIG. 9 follows the same pattern as the LO oscillator 382, 384 but with an inverted phase such that the LO induced modulation is reduced or removed by the Complex Compensation Stage 370.

Figure 10:
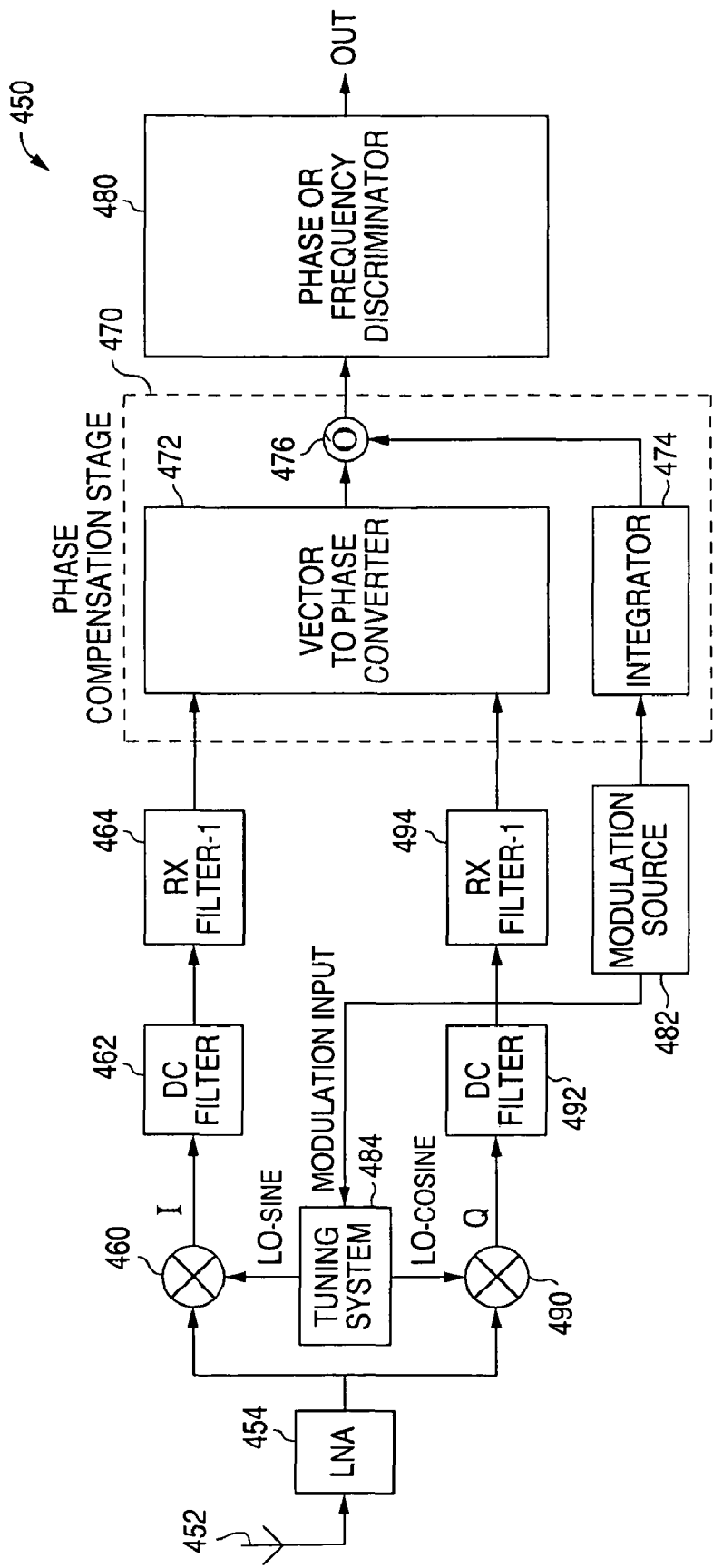
FIG. 10 is a functional block diagram illustrating an embodiment of a receiver having a phase sensitive demodulator that performs compensation in a phase domain.

FIG. 10 is a functional block diagram illustrating an embodiment of a receiver 450 having a phase sensitive demodulator (e.g. to detect PSK or FSK) that performs phase compensation in a complex Phase Compensation Stage 470 inserted into the I and Q channels. In the embodiment of FIG. 10, the phase compensation stage 470 includes a Vector to Phase Converter 472 having a first input electrically coupled to an output of an I channel RX filter 464 and a second input coupled to a Q channel RX filter 494. An integrator 474 receives the modulation control signal from the Modulation Source 482 and integrates it into a signal that represents the phase modulation of the signal at the output of the tuning system 484, which is input to a negative input of a summer 476. The phase output of the Vector to Phase Converter 472 is input to a positive input of the summer 476 such that the integrated modulated input is subtracted from the phase output from the I and Q channels and the resulting difference signal output to demodulator 480, which, in this example, is a Phase or Frequency Discriminator 480, that produces the received data signal from the difference signal. In this embodiment, the compensation for the LO modulation is provided in the phase domain.

Note that the techniques described herein may be obtained using either digital or analog signal processing techniques without departing from the scope of the invention. Also note that either frequency modulation and phase modulation may be utilized in certain applications of the techniques described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A modulated intermediate frequency receiver, the receiver comprising:
    a low noise amplifier having an input for receiving a radio frequency signal and an output;
    a modulation source configured to generate a modulation control signal at an output;
    a local oscillator having an input coupled to the output of the modulation source, the local oscillator being configured to generate a modulated local oscillator signal at a first output of the local oscillator in response to the modulation control signal from the modulation source;
    a first mixer having a first input coupled to the first output of the low noise amplifier, a second input coupled to the output of the local oscillator, and an output;
    a first DC filter having an input coupled to the output of the first mixer and an output;
    a first receive filter having an input coupled to the output of the first DC filter and an output; and
    a demodulator having a first input coupled to the output of the first receive filter and configured to generate a demodulated received signal at an output;
    where the modulation source is configured to generate a modulated oscillator control signal that controls the local oscillator to generate the modulated local oscillator signal to at least one of:
        vary the frequency of the local oscillator signal higher and lower within a receive bandwidth frequency of the radio frequency signal, or
        cause positive and negative phase shifts of a nominal phase of the local oscillator signal to distribute the energy of the received signal within the receive bandwidth frequency of the radio frequency signal.

2. The modulated intermediate frequency receiver of claim 1, where the receiver further comprises:
    a compensation stage interposed the first receive filter and the demodulator, the compensation stage having a first input coupled to the output of the first receiver filter, a second input, and an output;
    a second receive filter interposed the first receiver filter and the demodulator, the second receive filter having an input coupled to the output of the compensation stage and an output coupled to the first input of the demodulator; and
    where the modulation source is further configured to generate a second modulation control signal at a second output that is coupled to the second input of the compensation stage, where the second modulation control signal is related to the modulation control signal.

3. The modulated intermediate frequency receiver of claim 1, wherein:
    the local oscillator is further configured to generate a sine phase of the modulated local oscillator signal at the first output of the local oscillator and generate a cosine phase of the modulated local oscillator signal at a second output of the local oscillator;
    the demodulator includes a second input and the demodulator is further configured to generate the demodulated received signal from signals received from the first and second inputs of the demodulator;
    and the receiver further comprises:
    a second mixer having a first input coupled to the output of the low noise amplifier, a second input coupled to the second output of the local oscillator, and an output;
    a second DC filter having an input coupled to the output of the second mixer and an output;
    a second receive filter having an input coupled to the output of the second DC filter and an output coupled to the second input of the demodulator.

4. The modulated intermediate frequency receiver of claim 3, where the receiver further comprises:
    a complex compensation stage interposed the first and second receive filters and the demodulator, the complex compensation stage having a first input coupled to the output of the first receiver filter, a second input coupled to the output of the second receiver filter, a third input, and first and second outputs;
    a third receive filter interposed the first receiver filter and the demodulator, the third receive filter having an input coupled to the first output of the compensation stage and an output coupled to the first input of the demodulator;

a fourth receive filter interposed the second receiver filter and the demodulator, the fourth receive filter having an input coupled to the second output of the compensation stage and an output coupled to the second input of the demodulator; and where the modulation source is further configured to generate a second modulation control signal at a second output that is coupled to the third input of the complex compensation stage, where the second modulation control signal is related to the modulation control signal.

5. The modulated intermediate frequency receiver of claim 4, where the complex compensation stage further comprises:
a complex oscillator having an input coupled to the third input of the complex compensation stage, where the complex oscillator is configured to generate a sine phase signal at a first output and a cosine phase signal at a second output responsive to the second modulation control signal received from the modulation source;
a third mixer having a first input coupled to the first input of the complex compensation stage, a second input coupled to the first output of the complex oscillator, and an output;
a fourth mixer having a first input coupled to the first input of the complex compensation stage, a second input coupled to the second output of the complex oscillator, and an output;
a fifth mixer having a first input coupled to the second input of the complex compensation stage, a second input coupled to the second output of the complex oscillator, and an output;
a sixth mixer having a first input coupled to the second input of the complex compensation stage, a second input coupled to the first output of the complex oscillator, and an output;
a first summer having a first input coupled to the output of the third mixer, a second input coupled to the output of the fifth mixer, and an output coupled to the first output of the complex compensation stage; and
a second summer having a first input coupled to the output of the fourth mixer, a second input coupled to the output of the sixth mixer, and an output coupled to the second output of the complex compensation stage.

6. The modulated intermediate frequency receiver of claim 1, where the modulation control signal generated by the modulation source causes the modulated local oscillator signal at a first output of the local oscillator to have at least one of frequency modulation and phase modulation.

7. The modulated intermediate frequency receiver of claim 1, where the modulation source is configured to generate a modulated oscillator control signal that controls the local oscillator to generate the modulated local oscillator signal to at least one of:
repeatedly ramp the frequency of the local oscillator signal up to an upper limit of the receive bandwidth frequency and then ramp the frequency of the local oscillator signal down to a lower limit of a receive bandwidth frequency; or
cause positive and negative phase shifts of a nominal phase of the local oscillator signal to distribute the energy of the received signal across the receive bandwidth frequency.

8. The modulated intermediate frequency receiver of claim 1, where the receiver produces a receive channel frequency response; where the first DC filter is configured to create a notch in the receive channel frequency response; and where the modulation source is configured to generate a modulated oscillator control signal that controls the local oscillator to generate the modulated local oscillator signal to move the notch to multiple different positions within the receive channel frequency response.

9. The modulated intermediate frequency receiver of claim 1, where the receiver is configured to produce a receive channel frequency response; where the output of the first mixer is configured to produce a mixed signal; and where the modulation source is configured to generate a modulated oscillator control signal that controls the local oscillator to vary the position of the mixed signal relative to a center frequency of the receive channel frequency response.

10. The modulated intermediate frequency receiver of claim 1, where the receiver is configured to produce a receive channel frequency response; where the first DC filter is configured to create a notch in the receive channel; and where the modulation source is configured to generate a modulated oscillator control signal that controls the local oscillator to generate the modulated local oscillator signal to vary the position of the notch relative to a center frequency of the receive channel frequency response.

11. The modulated intermediate frequency receiver of claim 10, where the center frequency of the receive channel frequency response is substantially equal to the average frequency of the local oscillator.

12. The modulated intermediate frequency receiver of claim 1, where there is no mixer coupled between the first DC Filter and the demodulator.

13. A modulated intermediate frequency receiver with phase compensation, the receiver comprising:
a low noise amplifier having an input for receiving a radio frequency signal and an output;
a modulation source configured to generate a first modulation control signal at a first output and generate a second modulation control signal at a second output, where the second modulation control signal is related to the first modulation control signal;
a local oscillator having an input coupled to the first output of the modulation source, the local oscillator being configured to generate a sine phase local oscillator signal at a first output and a cosine phase local oscillator signal at a second output in response to the first modulation control signal from the modulation source;
a first mixer having a first input coupled to the first output of the low noise amplifier, a second input coupled to the first output of the local oscillator, and an output;
a first DC filter having an input coupled to the output of the first mixer and an output;
a first receive filter having an input coupled to the output of the first DC filter and an output;
a second mixer having a first input coupled to the output of the low noise amplifier, a second input coupled to the second output of the local oscillator, and an output;
a second DC filter having an input coupled to the output of the second mixer and an output;
a second receive filter having an input coupled to the output of the second DC filter and an output;
a phase compensation stage having a first input coupled to the output of the first receiver filter, a second input coupled to the output of the second receiver filter, a third input coupled to the second output of the modulation source, and an output; and
a discriminator having a first input coupled to the output of the phase compensation stage and configured to generate a received data signal at an output.

where the modulation source is configured to generate a modulated oscillator control signal that controls the local oscillator to generate the modulated local oscillator signal to at least one of:
vary the frequency of the local oscillator signal higher and lower within a receive bandwidth frequency of the radio frequency signal, or
cause positive and negative phase shifts of a nominal phase of the local oscillator signal to distribute the energy of the received signal within the receive bandwidth of the radio frequency signal.

14. The modulated intermediate frequency receiver with phase compensation of claim 13, the phase compensation stage further comprising:
a vector to phase converter having a first input coupled to the first input of the phase compensation stage, a second input coupled to the second input of the phase compensation stage, and an output;
an integrator having a first input coupled to the third input of the phase compensation stage and an output; and
a summer having a first input coupled to the output of the vector to phase converter, a second input coupled to the output of the integrator, and an output coupled to the output of the phase compensation stage.

15. A method for receiving a signal in a modulated intermediate frequency receiver, the method comprising the steps of:
receiving and amplifying a radio frequency signal to obtain a received radio frequency signal;
generating a first modulation control signal;
generating a first modulated local oscillator signal responsive to the first modulation control signal;
mixing the received radio frequency signal with the first modulated local oscillator signal to obtain a first modulated intermediate frequency signal;
DC filtering the first modulated intermediate frequency signal to obtain a first DC filtered modulated intermediate frequency signal; and
receive channel bandwidth filtering the first DC filtered modulated intermediate frequency signal to obtain a first bandwidth filtered receive signal; and
demodulating the first bandwidth filtered receive signal to obtain a received data signal;
where the method further comprises generating the first modulated oscillator control signal to at least one of:
vary the frequency of the local oscillator signal higher and lower within a receive bandwidth frequency of the radio frequency signal, or
cause positive and negative phase shifts of a nominal phase of the local oscillator signal to distribute the energy of the received signal within the receive bandwidth of the radio frequency signal.

16. The method for receiving a signal in a modulated intermediate frequency receiver of claim 15, the method further comprising:
generating a second modulation control signal related to the first modulation control signal;
mixing the second modulation control signal with the first bandwidth filtered receive signal to reduce modulation introduced by the first modulation control signal to obtain a first compensated receive signal; and
receive channel bandwidth filtering the first compensated receive signal before demodulating to obtain the received data signal.

17. The method for receiving a signal in a modulated intermediate frequency receiver of claim 15, where the step of generating a first modulated local oscillator signal responsive to the first modulation control signal further comprises at least one of generating the first modulated local oscillator signal with frequency modulation and generating the first modulated local oscillator signal with phase modulation.

18. The method for receiving a signal in a modulated intermediate frequency receiver of claim 15, wherein:
the step of the generating a first modulated local oscillator signal further comprises generating a sine phase and a cosine phase of the first modulated local oscillator signal;
the step of mixing the received radio frequency signal with the first modulated local oscillator signal to obtain a first modulated intermediate frequency signal further comprises mixing the received radio frequency signal with the sine phase of the first modulated local oscillator signal to obtain the first modulated intermediate frequency signal;
and the method further includes the steps of:
mixing the received radio frequency signal with the cosine phase of the first modulated local oscillator signal to obtain a second modulated intermediate frequency signal;
DC filtering the second modulated intermediate frequency signal to obtain a second DC filtered modulated intermediate frequency signal; and
receive channel bandwidth filtering the second DC filtered modulated intermediate frequency signal to obtain a second bandwidth filtered receive signal; and
the step of demodulating the first bandwidth filtered receive signal to obtain a received data signal further comprises demodulating the first and second bandwidth filtered receive signals to obtain the received data signal.

19. The method for receiving a signal in a modulated intermediate frequency receiver of claim 18, the method further including the steps of:
generating a second modulation control signal related to the first modulation control signal;
using the second modulation control signal to compensate the first bandwidth filtered receive signal to reduce modulation introduced by the first modulation control signal to obtain a first compensated receive signal;
receive channel bandwidth filtering the first compensated receive signal before demodulating to obtain the received data signal;
using the second modulation control signal to compensate the second bandwidth filtered receive signal to reduce modulation introduced by the first modulation control signal to obtain a second compensated receive signal;
receive channel bandwidth filtering the second compensated receive signal before demodulating to obtain the received data signal; and
the step of demodulating the first and second bandwidth filtered receive signals to obtain the received data signal further comprises demodulating the first and second compensated receive signals to obtain the received data signal.

20. The method for receiving a signal in a modulated intermediate frequency receiver of claim 19, wherein:
the method further comprises generating a sine phase compensation signal and a cosine phase compensation signal responsive to the second modulation control signal;
the step of using the second modulation control signal to compensate the first bandwidth filtered receive signal to reduce frequency modulation further comprises the steps of:

mixing the sine phase compensation signal with the first bandwidth filtered receive signal to obtain a first sine phase compensated receive signal;

mixing the cosine phase compensation signal with the first bandwidth filtered receive signal to obtain a first cosine phase compensated receive signal; and summing the first sine phase compensated receive signal with a second cosine phase compensated signal to obtain the first compensated receive signal;

the step of using the second modulation control signal to compensate the second bandwidth filtered receive signal to reduce modulation further comprises the steps of:

mixing the sine phase compensation signal with the second bandwidth filtered receive signal to obtain a second sine phase compensated receive signal;

mixing the cosine phase compensation signal with the second bandwidth filtered receive signal to obtain the second cosine phase compensated receive signal; and summing the second sine phase compensated receive signal with the first cosine phase compensated signal to obtain the first compensated receive signal.

21. The method for receiving a signal in a modulated intermediate frequency receiver of claim 18, where the method further includes the steps of:

generating a second modulation control signal related to the first modulation control signal;

integrating the second modulation control signal to obtain an integrated compensation signal;

converting the first and second bandwidth filtered receive signals to a vector to phase converted bandwidth filtered receive signal; and summing the vector to phase converted bandwidth filtered receive signal and the compensation signal to obtain a phase compensated receive signal; and the step of demodulating the first and second compensated receive signals to obtain the received data signal further comprises phase or frequency discriminating the phase compensated receive signal to obtain the received data signal.

22. The method for receiving a signal in a modulated intermediate frequency receiver of claim 15, the method further comprising generating the first modulated oscillator control signal to at least one of:

repeatedly ramp the frequency of the local oscillator signal up to an upper limit of the receive bandwidth frequency and then ramp the frequency of the local oscillator signal down to a lower limit of a receive bandwidth frequency; or cause positive and negative phase shifts of a nominal phase of the local oscillator signal to distribute the energy of the received signal across the receive bandwidth frequency.

23. The method for receiving a signal in a modulated intermediate frequency receiver of claim 15, the method further comprising:

producing a receive channel frequency response, the DC filtering creating a notch in the receive channel frequency response; and generating the first modulated oscillator control signal to move the notch to multiple different positions within the receive channel frequency response.

24. The method for receiving a signal in a modulated intermediate frequency receiver of claim 15, the method further comprising:

producing a receive channel frequency response; and generating the first modulated oscillator control signal to vary the position of the mixed signal relative to a center frequency of the receive channel frequency response.

25. The method for receiving a signal in a modulated intermediate frequency receiver of claim 15, the method further comprising:

producing a receive channel frequency response; and generating the first modulated oscillator control signal to vary the position of the notch relative to a center frequency of the receive channel frequency response.

26. The method for receiving a signal in a modulated intermediate frequency receiver of claim 15, where the center frequency of the receive channel frequency response is substantially equal to the average frequency of the local oscillator.

27. The method for receiving a signal in a modulated intermediate frequency receiver of claim 15, further comprising performing no signal mixing step between the step of mixing the received radio frequency signal with the first modulated local oscillator signal to obtain a first modulated intermediate frequency signal and the step of demodulating the first bandwidth filtered receive signal to obtain a received data signal.

28. A modulated intermediate frequency receiver, the receiver comprising:

a low noise amplifier having an input for receiving a radio frequency signal and an output;

a modulation source configured to generate a modulation control signal at an output;

a local oscillator having an input coupled to the output of the modulation source, the local oscillator being configured to generate a modulated local oscillator signal at a first output of the local oscillator in response to the modulation control signal from the modulation source;

a first mixer having a first input coupled to the first output of the low noise amplifier, a second input coupled to the output of the local oscillator, and an output;

a first DC filter having an input coupled to the output of the first mixer and an output;

a first receive filter having an input coupled to the output of the first DC filter and an output; and a demodulator having a first input coupled to the output of the first receive filter and configured to generate a demodulated received signal at an output;

wherein the local oscillator is further configured to generate a sine phase of the modulated local oscillator signal at the first output of the local oscillator and generate a cosine phase of the modulated local oscillator signal at a second output of the local oscillator, and the demodulator includes a second input and the demodulator is further configured to generate the demodulated received signal from signals received from the first and second inputs of the demodulator;

where the receiver further comprises:

a second mixer having a first input coupled to the output of the low noise amplifier, a second input coupled to the second output of the local oscillator, and an output;

a second DC filter having an input coupled to the output of the second mixer and an output;

a second receive filter having an input coupled to the output of the second DC filter and an output coupled to the second input of the demodulator;

a complex compensation stage interposed the first and second receive filters and the demodulator, the complex compensation stage having a first input coupled to the output of the first receive filter, a second input coupled to the output of the second receive filter, a third input, and first and second outputs;

a third receive filter interposed the first receive filter and the demodulator, the third receive filter having an input coupled to the first output of the compensation stage and an output coupled to the first input of the demodulator;

a fourth receive filter interposed the second receive filter and the demodulator, the fourth receive filter having an input coupled to the second output of the compensation stage and an output coupled to the second input of the demodulator; and where the modulation source is further configured to generate a second modulation control signal at a second output that is coupled to the third input of the complex compensation stage, where the second modulation control signal is related to the modulation control signal; and where the complex compensation stage further comprises:

a complex oscillator having an input coupled to the third input of the complex compensation stage, where the complex oscillator is configured to generate a sine phase signal at a first output and a cosine phase signal at a second output responsive to the second modulation control signal received from the modulation source;

a third mixer having a first input coupled to the first input of the complex compensation stage, a second input coupled to the first output of the complex oscillator, and an output;

a fourth mixer having a first input coupled to the first input of the complex compensation stage, a second input coupled to the second output of the complex oscillator, and an output;

a fifth mixer having a first input coupled to the second input of the complex compensation stage, a second input coupled to the second output of the complex oscillator, and an output;

a sixth mixer having a first input coupled to the second input of the complex compensation stage, a second input coupled to the first output of the complex oscillator, and an output;

a first summer having a first input coupled to the output of the third mixer, a second input coupled to the output of the fifth mixer, and an output coupled to the first output of the complex compensation stage; and a second summer having a first input coupled to the output of the fourth mixer, a second input coupled to the output of the sixth mixer, and an output coupled to the second output of the complex compensation stage.

29. A method for receiving a signal in a modulated intermediate frequency receiver, the method comprising the steps of:

receiving and amplifying a radio frequency signal to obtain a received radio frequency signal;

generating a first modulation control signal;

generating a first modulated local oscillator signal responsive to the first modulation control signal;

mixing the received radio frequency signal with the first modulated local oscillator signal to obtain a first modulated intermediate frequency signal;

DC filtering the first modulated intermediate frequency signal to obtain a first DC filtered modulated intermediate frequency signal;

receive channel bandwidth filtering the first DC filtered modulated intermediate frequency signal to obtain a first bandwidth filtered receive signal; and demodulating the first bandwidth filtered receive signal to obtain a received data signal;

where the step of the generating a first modulated local oscillator signal further comprises generating a sine phase and a cosine phase of the first modulated local oscillator signal;

where the step of mixing the received radio frequency signal with the first modulated local oscillator signal to obtain a first modulated intermediate frequency signal further comprises mixing the received radio frequency signal with the sine phase of the first modulated local oscillator signal to obtain the first modulated intermediate frequency signal;

where the method further includes the steps of:

mixing the received radio frequency signal with the cosine phase of the first modulated local oscillator signal to obtain a second modulated intermediate frequency signal;

DC filtering the second modulated intermediate frequency signal to obtain a second DC filtered modulated intermediate frequency signal; and receive channel bandwidth filtering the second DC filtered modulated intermediate frequency signal to obtain a second bandwidth filtered receive signal;

where the step of demodulating the first bandwidth filtered receive signal to obtain a received data signal further comprises demodulating the first and second bandwidth filtered receive signals to obtain the received data signal;

where the method further includes the steps of:

generating a second modulation control signal related to the first modulation control signal;

using the second modulation control signal to compensate the first bandwidth filtered receive signal to reduce modulation introduced by the first modulation control signal to obtain a first compensated receive signal;

receive channel bandwidth filtering the first compensated receive signal before demodulating to obtain the received data signal;

using the second modulation control signal to compensate the second bandwidth filtered receive signal to reduce modulation introduced by the first modulation control signal to obtain a second compensated receive signal;

receive channel bandwidth filtering the second compensated receive signal before demodulating to obtain the received data signal;

where the step of demodulating the first and second bandwidth filtered receive signals to obtain the received data signal further comprises demodulating the first and second compensated receive signals to obtain the received data signal;

where the method further comprises generating a sine phase compensation signal and a cosine phase compensation signal responsive to the second modulation control signal;

where the step of using the second modulation control signal to compensate the first bandwidth filtered receive signal to reduce frequency modulation further comprises the steps of:

mixing the sine phase compensation signal with the first bandwidth filtered receive signal to obtain a first sine phase compensated receive signal;

mixing the cosine phase compensation signal with the first bandwidth filtered receive signal to obtain a first cosine phase compensated receive signal; and summing the first sine phase compensated receive signal with a second cosine phase compensated signal to obtain the first compensated receive signal;

where the step of using the second modulation control signal to compensate the second bandwidth filtered receive signal to reduce modulation further comprises the steps of:

mixing the sine phase compensation signal with the second bandwidth filtered receive signal to obtain a second sine phase compensated receive signal;

mixing the cosine phase compensation signal with the second bandwidth filtered receive signal to obtain the second cosine phase compensated receive signal; and summing the second sine phase compensated receive signal with the first cosine phase compensated signal to obtain the second compensated receive signal.

30. A method for receiving a signal in a modulated intermediate frequency receiver, the method comprising the steps of:

receiving and amplifying a radio frequency signal to obtain a received radio frequency signal;

generating a first modulation control signal;

generating a first modulated local oscillator signal responsive to the first modulation control signal;

mixing the received radio frequency signal with the first modulated local oscillator signal to obtain a first modulated intermediate frequency signal;

DC filtering the first modulated intermediate frequency signal to obtain a first DC filtered modulated intermediate frequency signal;

receive channel bandwidth filtering the first DC filtered modulated intermediate frequency signal to obtain a first bandwidth filtered receive signal; and demodulating the first bandwidth filtered receive signal to obtain a received data signal;

where the step of the generating a first modulated local oscillator signal further comprises generating a sine phase and a cosine phase of the first modulated local oscillator signal;

where the step of mixing the received radio frequency signal with the first modulated local oscillator signal to obtain a first modulated intermediate frequency signal further comprises mixing the received radio frequency signal with the sine phase of the first modulated local oscillator signal to obtain the first modulated intermediate frequency signal;

where the method further includes the steps of:

mixing the received radio frequency signal with the cosine phase of the first modulated local oscillator signal to obtain a second modulated intermediate frequency signal;

DC filtering the second modulated intermediate frequency signal to obtain a second DC filtered modulated intermediate frequency signal; and receive channel bandwidth filtering the second DC filtered modulated intermediate frequency signal to obtain a second bandwidth filtered receive signal;

where the step of demodulating the first bandwidth filtered receive signal to obtain a received data signal further comprises demodulating the first and second bandwidth filtered receive signals to obtain the received data signal; and where the method further includes the steps of:

generating a second modulation control signal related to the first modulation control signal;

integrating the second modulation control signal to obtain an integrated compensation signal;

converting the first and second bandwidth filtered receive signals to a vector to phase converted bandwidth filtered receive signal; and summing the vector to phase converted bandwidth filtered receive signal and the compensation signal to obtain a phase compensated receive signal;

where the step of demodulating the first and second compensated receive signals to obtain the received data signal further comprises phase or frequency discriminating the phase compensated receive signal to obtain the received data signal.

\* \* \* \* \*